United States Patent [19]

Sawyer

[11] 4,315,518
[45] Feb. 16, 1982

[54] METHODS OF AND SYSTEM FOR CONTROLLING COPPER CONCENTRATION IN A SOLUTION

[75] Inventor: Ernest W. Sawyer, Richmond, Va.

[73] Assignee: Western Electric Company, Inc., New York, N.Y.

[21] Appl. No.: 164,656

[22] Filed: Jun. 30, 1980

[51] Int. Cl.³ ............................................. G05D 11/13
[52] U.S. Cl. ........................................ 137/3; 137/93; 204/52 R; 204/195 R
[58] Field of Search ................... 137/3, 93; 204/52 R, 204/106, 195 R

[56] References Cited

U.S. PATENT DOCUMENTS

| | | |
|---|---|---|
| 3,298,934 | 1/1967 | Angeleri . |
| 3,375,178 | 3/1968 | Locke . |
| 3,532,519 | 10/1970 | Hirohata et al. . |
| 3,709,100 | 6/1974 | Hilton et al. . |
| 3,857,762 | 12/1974 | Morrow et al. . |
| 3,951,602 | 7/1976 | Thompson . |
| 3,959,108 | 5/1976 | Pumpe . |
| 4,065,363 | 12/1977 | Herrmann . |
| 4,066,092 | 1/1978 | Dulger et al. ......................... 137/93 |
| 4,068,677 | 1/1978 | DeSteur et al. ....................... 137/93 |

Primary Examiner—William R. Cline
Attorney, Agent, or Firm—J. B. Hoofnagle

[57] ABSTRACT

A sample of copper electroless plating solution, containing complexed cupric ions, is modified to provide a concentration of uncomplexed cupric ions. A pH probe (40) monitors the pH level of the modified sample and feeds a signal to a pH control circuit (42) which selectively adds a diluted acid in order to maintain the pH level of the modified sample at a desired level. Specific ion and reference probes (44 and 46) are positioned in the modified sample where, in the presence of uncomplexed cupric ions, a voltage signal is developed. The voltage signal, which is indicative of the copper concentration of the modified sample, is a measure of the copper concentration in the plating solution. A copper control circuit (48), which is responsive to the developed voltage signal, facilitates the addition of cupric ions to the plating solution to maintain a desired ratio of complexer to copper concentration.

17 Claims, 3 Drawing Figures

METHODS OF AND SYSTEM FOR CONTROLLING COPPER CONCENTRATION IN A SOLUTION

TECHNICAL FIELD

This invention relates to methods of and a system for controlling copper concentration in a solution and, particularly, to a method of controlling copper concentration in an electroless plating bath.

BACKGROUND OF THE INVENTION

A printed circuit may include a nonconductive substrate having defined metallic conductive circuit paths formed on one or both major surfaces of the substrate. Holes may be formed through the substrate to provide for electrical connection with later-assembled leads of components in the case of a single-sided printed circuit. Holes formed through the substrate of a double-sided printed circuit eventually become (1) metallic-lined through holes selectively linking the circuit baths on both sides of the substrate or (2) holes which provide for electrical connection with later assembled leads of components.

There are a variety of methods of manufacturing printed circuits such as substractive, semi-additive and fully additive. The subtractive method initially requires copper cladding on the substrate whereafter copper is removed to form the circuit paths. The semi-additive method requires adding a thin layer of copper to an unclad substrate and then the copper is etched away to form the circuit paths. The fully-additive method is an improvement over the previous two methods in that metal is only plated where it is desired. Thus, the costly process of removing copper from the substrate as well as the loss of copper in waste material is avoided.

In one method of manufacturing printed circuits using an electroless plating method, holes are formed through a copperless substrate which is then chemically cleaned. A thin ultraviolet sensitive film is applied to the major surfaces of the substrate which is subsequently exposed to an ultraviolet light through a positive art master of the desired circuit pattern. The substrate is then treated with a developer to remove those areas of the film which were not exposed to reveal an image of a filmless area in the desired circuit pattern. Subsequently, the substrate is chemically treated to roughen the surfaces of the substrate in the area of the desired circuit pattern. A palladium-bearing catalyst solution is applied to the surfaces of the substrate. The substrate is placed in an electroless copper solution for a period of one to five minutes to plate a thin porous copper layer over the palladium. This thin copper layer enhances the image and provides for longer storage of the substrate prior to ultimate copper plating. The substrate is then contacted by a stripper which removes the thin film, the palladium and copper from the exposed areas but leaves intact the copper deposited in the desired circuit pattern. The substrate is subsequently placed into an electroless plating bath of an aqueous solution containing cupric ions where copper is deposited in the circuit pattern to a sufficient thickness as dictated by product requirements.

This method of plating requires a controlled level of cupric ions in the bath to (1) insure a desired plating rate, (2) provide good metallic properties of the deposit and (3) minimize any tendency toward extraneous plating. The electroless plating process normally requires an alkaline solution which contains a cupric salt and has a high pH level. A complexing agent, such as ethylenediaminetetraacetate (EDTA), is added to the plating solution to prevent the precipitation of cupric hydroxide. In this use, complexer molarity will normally be greater than copper molarity. Normally in the absence of the complexing agent, cupric ions could be monitored by using a specific ion probe placed in the plating bath. However, complexed copper ions are not usually detectable with a specific ion probe.

U.S. Pat. No. 3,951,602, which issued to D. S. Thompson, discloses a system for continuously measuring copper ion concentration of an electroless copper plating bath and automatically replenishing the bath based on these measurements. The copper ion concentration of the bath is determined by a spectrophotometer which measures the amount of light absorbance by the bath at specific wavelengths. The copper ions are complexed and have a maximum absorbance at a known wavelength and pH level. The spectrophotometer measures the amount of absorbance of light at the known wavelength and compares it to the amount of absorbance of light at a reference wavelength to indicate the concentration of copper ions. An electrical signal representative of the copper ion concentration is generated by the spectrophotometer and transmitted to an electronic control and pump which replenishes the copper plating bath with a proper amount of copper sulfate solution.

The above method uses a colorimeteric technique. If a precipitate forms in the solution during the plating process, the amount of light absorbed is affected. This results in an erroneous measurement of the concentration of copper ions.

Consequently, there is a need for methods of and a system for controlling copper concentration in a solution which contains a complexer having a molarity greater than the copper molarity in a desired ratio.

SUMMARY OF THE INVENTION

This invention contemplates a method of and system for controlling copper concentration in a solution containing a complexer where complexer molarity exceeds copper molarity in a desired ratio. A sample is drawn from a first solution containing the complexer. A second solution containing a known concentration of cupric ions is added to the sample to form a combined solution where the copper molarity exceeds the complexer molarity. The copper concentration of the combined solution is determined as a measure of the copper concentration in the first solution. Cupric ions are added to the first solution in response to the determination of copper concentration of the combined solution to maintain the desired ratio.

DETAILED DESCRIPTION

Figure 1:
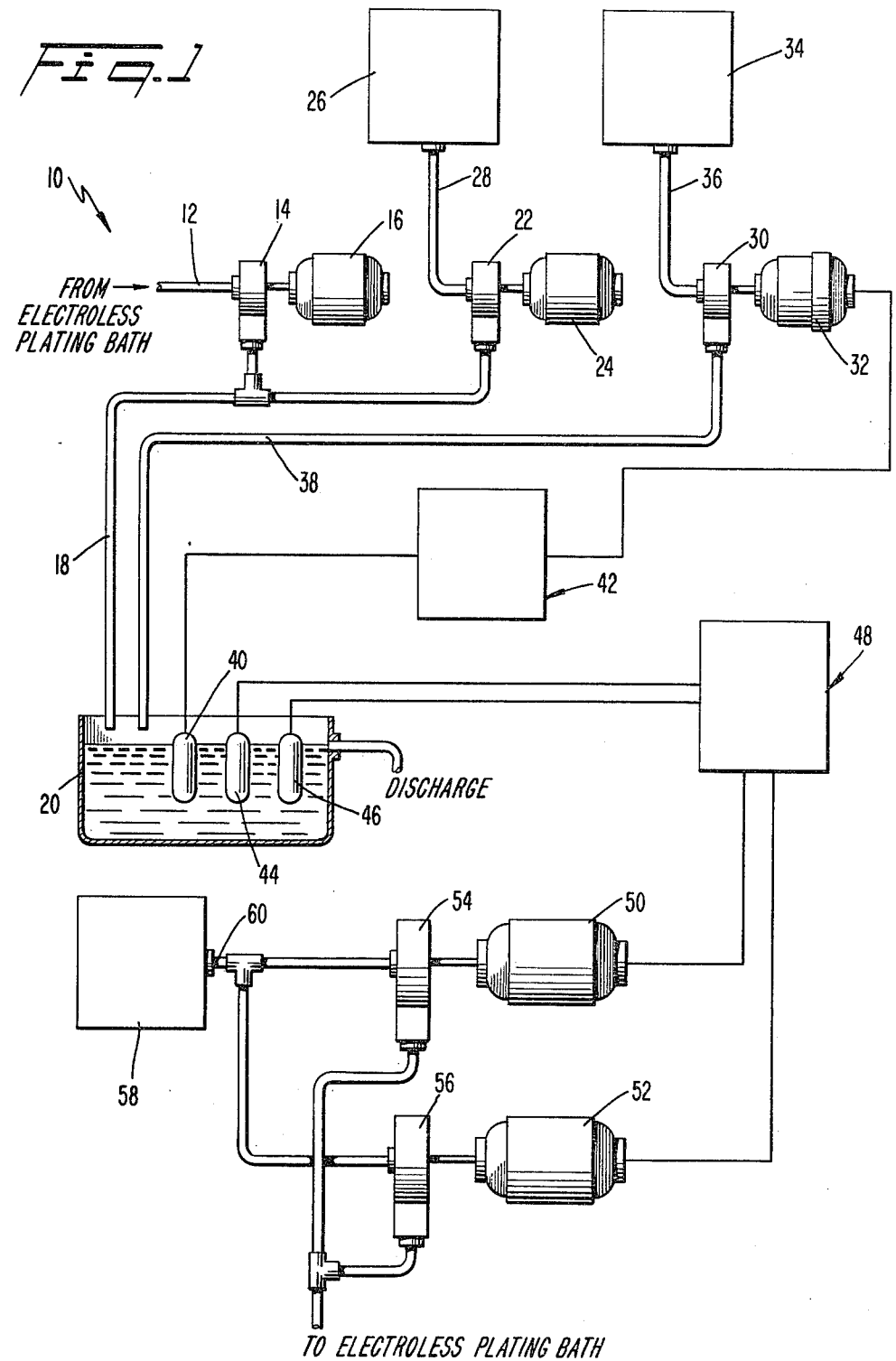
FIG. 1 is a schematic illustration of a system for controlling copper concentration within a solution in accordance with certain principles of the invention.

Referring to FIG. 1, a control system, designated generally by the numeral 10, determines the copper concentration of a solution utilized in an electroless plating bath (not shown) and adds copper concentrate when required. A sample is continuously drawn from the solution in the bath through inlet 12 by sampling pump 14. The sampling pump 14 is coupled to a synchronous motor 16 which facilitates a fixed sample flow rate. The sample, which flows through the pump 14 and a flow line 18, is collected by a test container 20.

Pump 22, which is coupled to a synchronous motor 24, continuously draws a copper sulfate-sulfuric acid solution from a supply container 26 through a flow line 28. The solution, which flows through pump 22 at a fixed rate, combines with the sample from the electroless plating solution in flow line 18 and is subsequently collected by the test container 20 to form a combined solution. Pump 30, which is connected to a variable speed motor 32, is controlled to draw a selected amount of diluted sulfuric acid from a container 34 through flow line 36. Flow line 38, which is connected to the pump 30, delivers the diluted sulfuric acid to the test container 20 when required.

The test sample taken from a fresh electroless plating solution normally has a pH of approximately 12.0. Due to the high pH level of the plating solution, a complexer, such as EDTA, is included in the plating solution to prevent precipitation of cupric hydroxide. To effectively prevent precipitation in the plating solution, complexer molarity exceeds copper molarity by a desired ratio.

With typically used complexing agents, such as EDTA, effective complexing occurs above a pH of approximately 3.0. Within a pH range of 3.0 to 7.0, uncomplexed cupric ions can remain in the solution without precipitating. As noted above, the fresh plating solution has a pH of approximately 12.0. Thus, in order to prevent precipitation of uncomplexed cupric ions which are present in the combined solution, the pH of the combined solution must be reduced below a level of 7.0. The solution in the supply container 26 includes a predetermined concentration of sulfuric acid which, when combined with the sample in flow line 18, will reduce the pH of the combined solution to a range of 5.0 to 6.0 depending on the age of the plating solution.

In order to maintain accurate continuous detection of uncomplexed cupric ions within the combined solution, the pH of the combined solution must be maintained substantially at a constant level. Otherwise, with a flucuating pH within the combined solution, successive instantaneous detection of uncomplexed cupric ions would not be determined on the same basis. Therefore, the resultant determination would not represent a true indication of the copper concentration in the plating solution.

As noted above, the pH of a fresh plating solution, and consequently of the sample drawn therefrom, is approximately 12.0. When the copper sulfate-sulfuric acid solution is combined with the fresh-solution sample, the pH of the combined solution is reduced to approximately 5.0. However, as the plating solution ages, the addition of the same amount of sulfuric acid solution will not lower the pH of the combined solution to approximately 5.0. Therefore, the level of the pH in the combined solution must be determined on a continuing basis so that additional acid may be added in order to maintain continuously the combined solution at a pH of approximately 5.0.

Although in the preferred embodiment of this invention a pH level of approximately 5.0 has been selected, it is to be understood that any level below which precipitate will not form can be used without departing from the spirit and scope of the invention. Moreover, instead of only reducing the pH of the combined solution to approximately 5.0, the pH could be reduced to a pH level, such as 4.0, by adding an acid solution and then raised to a pH level of approximately 5.0 by adding an alkaline solution. Thereafter the pH level is maintained at the desired level.

In order to insure a substantially constant pH within the combined solution, a pH probe 40, which monitors the pH of the combined solution within the container 20, feeds a signal to a pH control circuit, designated generally by the numeral 42. The circuit 42 controls the speed of the motor 32 which drives the pump 30. The pump 30 controls the rate at which diluted sulfuric acid flows into the container 20. The controlled addition of diluted sulfuric acid reduces the pH level of the solution in container 20 until a pH level of approximately 5.0 is attained. When the desired pH level of 5.0 is attained, the control circuit maintains the pH of the combined solution at the desired level.

The solution in some plating baths has a pH level of approximately 12.0. By adding diluted acid to the combined solution as noted above, the pH level of the combined solution is reduced to approximately 5.0. If the plating solution initially has a pH level within the range of 3.0 and 7.0, the procedure of reducing the pH level of the combined solution is not required.

A specific ion probe 44 and a reference probe 46 are also positioned within the container 20. If there are any uncomplexed cupric ions in the solution, that is, the copper molarity exceeds the complexer molarity, a voltage is developed between the specific ion probe 44 and the reference probe 46. This voltage is detected by a copper control circuit, designated generally by the numeral 48. If the copper concentration of the solution is below an acceptable level, the circuit 48 facilitates the control of motors 50 and 52 based upon the voltage sensed by the reference and specific ion probes 46 and 44, respectively. Motors 50 and 52 are coupled to pumps 54 and 56, respectively. Pumps 54 and 56 are connected by flow lines 60 to a container 58 which contains cupric sulfate concentrate. As each of pumps 54 and 56 is activated by motors 50 and 52, respectively, cupric sulfate is added to the plating solution in the electroless plating bath to increase copper concentration therein.

As noted above, the specific ion probe 44 and the reference probe 46 will detect only uncomplexed cupric ions. Moreover, the plating solution contains a complexer which, under normal conditions, exists at a desired ratio to copper concentration. Thus, if complexer molarity exceeds copper molarity, the probes 44 and 46 will not detect any cupric ions. In order to monitor the copper concentration in a solution where the complexer molarity exceeds the copper molarity, a known concentration of cupric ions must be added to the solution. For purposes of illustration, assume that for effective plating to occur, the solution in the plating bath contains 0.1 mole per liter of complexer and 0.08 mole per liter of copper. As noted above, the complexer molarity exceeds the copper molarity by the desired ratio, thus, the solution does not contain any uncomplexed cupric ions which can be detected by probes 44 and 46. In order to measure the copper concentration of the solution in the plating bath, the copper molarity must be increased above the complexer molarity. Let us assume that the solution in container 26 contains a known copper concentration such as 0.025 mole per liter. As noted above, the combined solution in container 20 includes the plating solution and the solution from container 26, where each solution is of equal volume, thus producing a combined copper concentration of 0.0525 mole per liter. Since the complexer molarity within container 20 is 0.1 mole per liter, there is 0.0025 mole per liter of copper not complexed and which can be detected by the probes 44 and 46. In response to such detection, the circuit 48 generates a voltage which is representative of an acceptable level of copper concentration in the bath.

If the copper concentration within the bath is below an acceptable level, for example, below 0.08 mole per liter but above 0.075 mole per liter, a lower voltage is detected by the probes 44 and 46 and the circuit 48 facilitates the activation of one or both of the motors 50 and 52. The activation of motors 50 and 52, in turn, activate pumps 54 and 56, respectively, which facilitate the addition of copper solution from container 58 to increase the copper concentration in the plating bath. When the probes 44 and 46 detect a level of cupric ions at the acceptable level, such as 0.0025 mole per liter in the combined solution, the circuit 48 facilitates the deactivation of motors 50 and 52 and pumps 54 and 56, respectively.

The sample taken from the plating solution contains 0.1 mole per liter of complexer and 0.08 mole per liter of copper. Since the complexer molarity exceeds the copper molarity, all of the cupric ions contained within the sample are complexed and the copper concentration can not be measured using the specific ion and reference probes 44 and 46. In order to measure the copper concentration of the sample, a solution which contains a selected concentration of cupric ions, such as 0.025 mole per liter, is added to the sample to form the combined solution. The volume of added cupric ion solution is equal to the volume of the sample. Since the combined solution volume is double each of the sample and cupric ion solutions, the molarity is reduced by a factor of one-half. This results in a combined solution having a copper concentration of 0.0525 mole per liter and a complexer concentration of 0.05 mole per liter. Thus, when the plating solution has the desired copper concentration of 0.08 mole per liter, the combined solution has a 0.0025 mole per liter concentration of uncomplexed cupric ions which can be measured. As noted above, for effective plating to occur, the copper concentration in the plating solution must be 0.08 mole per liter. Therefore, the copper concentration of 0.08 mole per liter in the plating solution is represented by a 0.0025 mole per liter concentration of uncomplexed cupric ions in the combined solution. For purposes of illustration, if the copper concentration of the plating solution decreases to 0.078 mole per liter, the concentration of uncomplexed cupric ions in the combined solution will decrease to 0.0015 mole per liter. When this decrease in concentration of uncomplexed cupric ions in the combined solution is detected, the system 10 facilitates the addition of cupric ions from container 58 to the plating solution until an uncomplexed cupric ion concentration of 0.0025 mole per liter in the combined solution is attained which, as noted above, is equivalent to a copper concentration of 0.08 mole per liter in the plating solution. This addition of cupric ion concentration to the plating solution maintains the desired ratio of complexer molarity to copper molarity.

Figure 2:
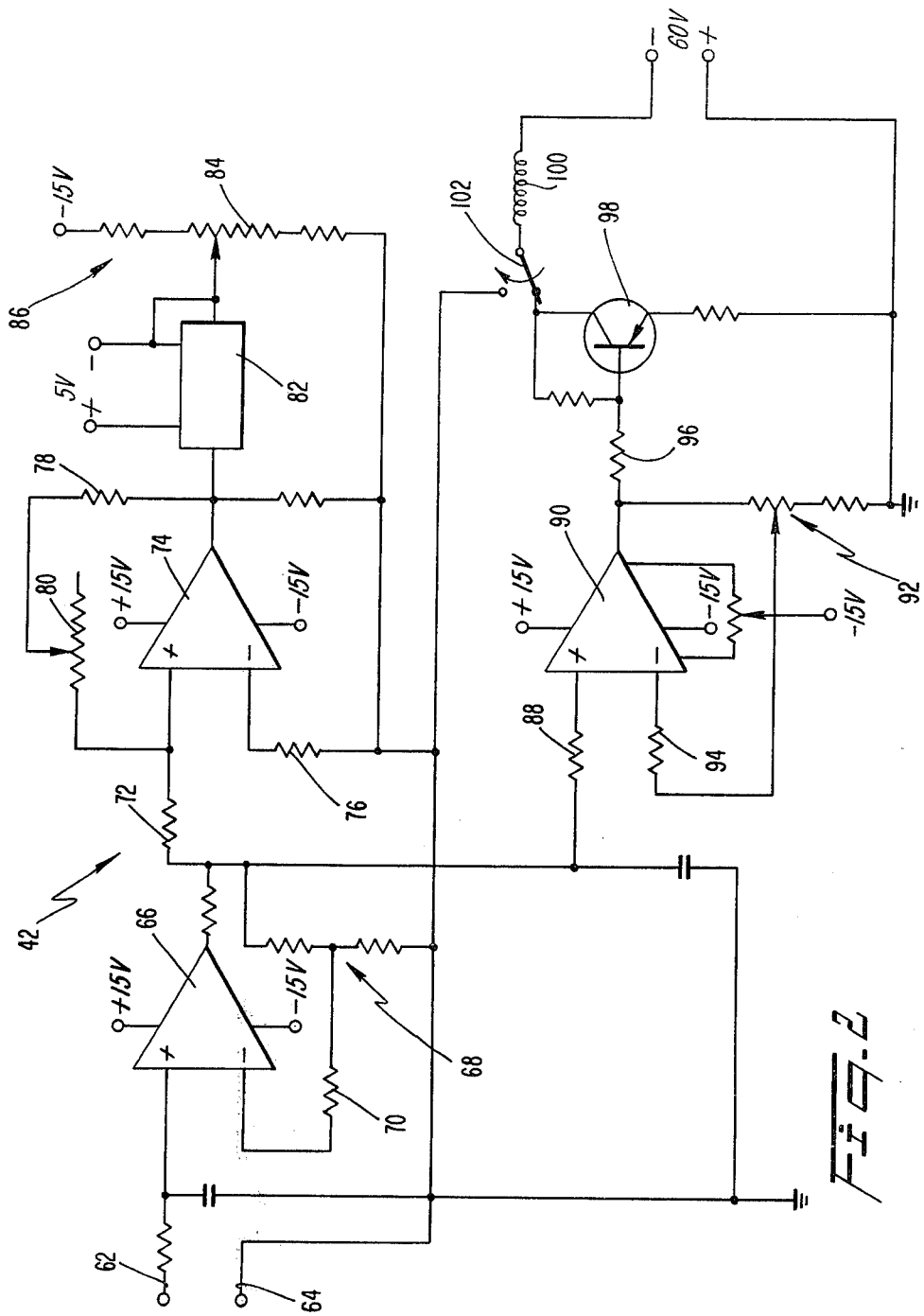
FIG. 2 is a schematic diagram of a pH control circuit which controls the addition of diluted acid in order to maintain the pH at a desired level.

A detailed schematic of the pH control circuit 42 is illustrated in FIG. 2. Signals from the pH probe 40 (FIG. 1) are fed to the pH control circuit 42 over lines 62 and 64. Line 62 is coupled to a noninverting input of an operational amplifier 66. Amplifier 66 is a commercially available integrated circuit identified as type LF155. A voltage divider network, designated generally by the numeral 68, is coupled to the output of the amplifier 66. A resistor 70 is connected between the voltage divider network 68 and the inverting input of the amplifier 66. The voltage divider network 68 and the resistor 70 determine the gain of the amplifier 66. The output of the amplifier 66 is also coupled through resistor 72 to an inverting input of an operational amplifier 74. The noninverting input of amplifier 74 is coupled through resistor 76 to ground potential. A feedback loop, which includes series-connected resistor 78 and potentiometer 80, is coupled between the output and the inverting input of the amplifier 74. A digital voltmeter 82 is coupled to the output of the amplifier 74. A potentiometer 84, which is included in a voltage divider network designated generally by the numeral 86, is coupled to a negative input of the voltmeter 82.

The output of the amplifier 66 is further coupled through resistor 88 to a noninverting input of an operational amplifier 90. A voltage divider network, designated generally by the numeral 92, is coupled to the output of the amplifier 90 and through resistor 94 to an inverting input of the amplifier. The output of the amplifier is coupled through a resistor 96 to the base of a transistor 98. A coil 100 of the motor 32 (FIG. 1) is coupled between a negative voltage source and the collector of transistor 98 through a switch 102.

The operation of the pH control circuit 42 requires an initial calibration of the digital voltmeter 82. The pH probe 40 generates (1) a positive voltage signal if the pH of the solution is less than approximately 5.0, (2) a zero voltage signal at a pH of approximately 5.0 or (3) a negative voltage signal for pH above approximately 5.0. Initially, the probe 40 is placed in a standard solution having a pH of 4.0. The potentiometer 84 is adjusted until the voltmeter 82 indicates four volts. The pH probe 40 is then placed in a standard solution having a pH of 7.0. The potentiometer 80 is adjusted until the voltmeter 82 indicates seven volts. The adjustment of potentiometer 80 affects the previous adjustment of potentiometer 84. Thus, this process is repeated until the voltmeter 82 indicates four volts when probe 40 is immersed in the standard solution having a pH of four and indicates seven volts when immersed in a standard solution having a pH of seven without additional adjustment of potentiometers 80 and 84.

As noted above the pH of the plating solution is approximately 12.0. In order to monitor copper concentration of the solution in container 20, a pH of approximately 5.0 is ultimately desired. For purposes of illustration, if the pH of the combined solution in container 20 is approximately 6.0 as noted above, a negative signal is fed over lines 62 and 64 by the pH probe 40. The negative signal appearing on lines 62 and 64 is amplified by amplifier 66 and is fed to the input of amplifier 74. Amplifier 74 inverts the signal and feeds it to the digital voltmeter 82 which should indicate a reading of approximately 6.0. The amplified negative signal is also fed to the input of amplifier 90. Since the negative signal is fed to the noninverting input, it is not inverted by amplifier 90. The signal appearing on the noninverting input is amplified by amplifier 90 and is fed to the base of transistor 98. Since the signal which appears on the base is negative, transistor 98 turns on. When transistor 98 turns on, current flows through the coil 100 of the motor 32, thus activating the motor.

Referring to FIG. 1, motor 32 is coupled to pump 30. As the pump 30 is activated, the selected amount of diluted sulfuric acid is added to the solution in container 30. The addition of diluted sulfuric acid to the solution in container 20 reduces the pH level contained therein. As the pH level of the solution in container 20 is reduced, the negative voltage detected by probe 40 is reduced until a pH of approximately 5.0 is attained at which time transistor 98 turns off and deactivates the motor 32. Switch 102 is included in the circuit to allow for manual operation of the motor 32.

Figure 3:
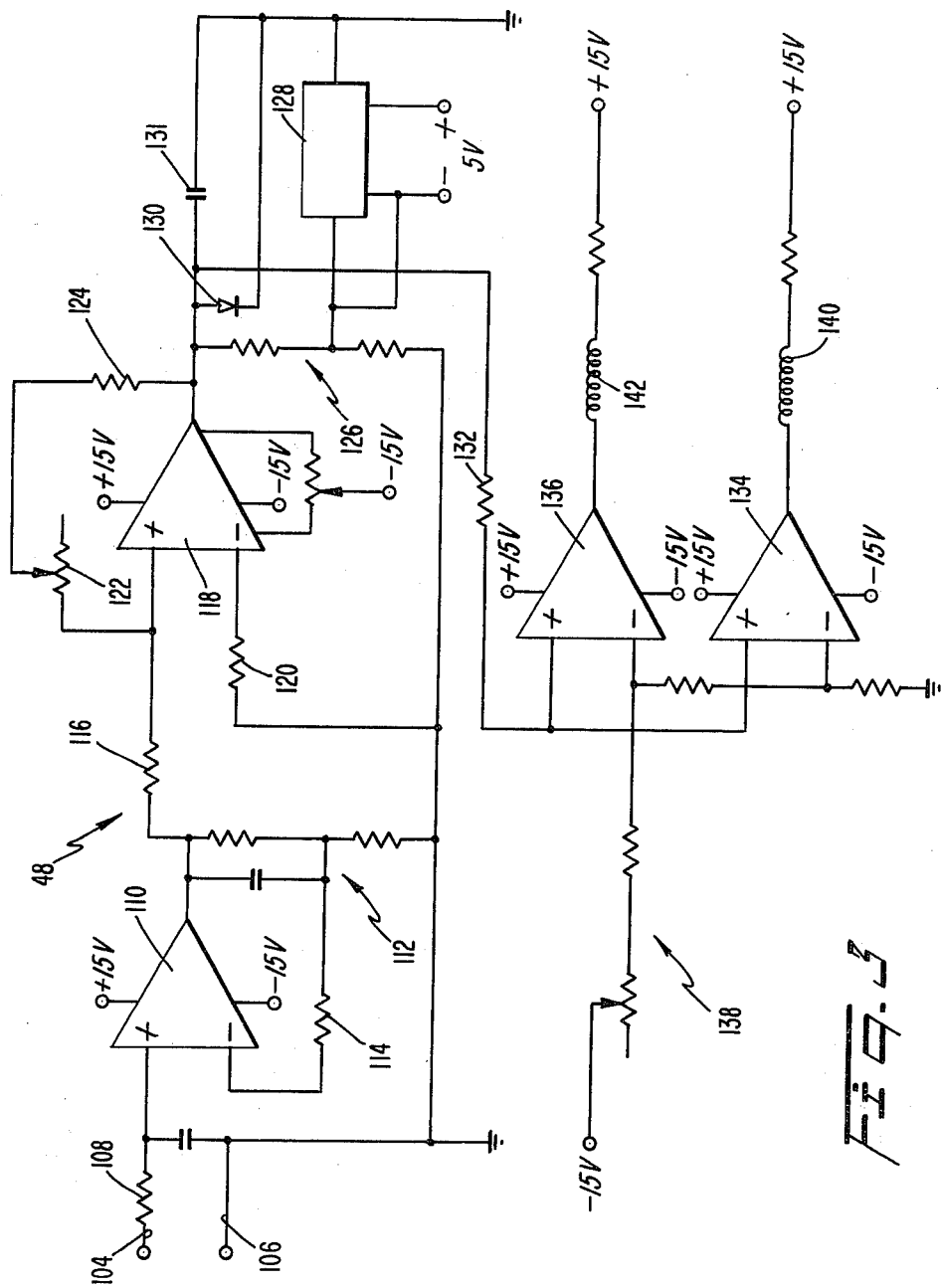
FIG. 3 is a schematic diagram of a copper control circuit which controls the addition of cupric ions to the solution.

A detailed schematic of the copper control circuit 48 is illustrated in FIG. 3. Signals from the specific ion probe 44 and the reference probe 46 are fed over lines 104 and 106, respectively. Line 104 is coupled through resistor 108 to a noninverting input of an operational amplifier 110. The amplifier 110 is of the same type as amplifier 66. A voltage divider network, designated generally by the numeral 112, is coupled to an output of the amplifier 110 and a voltage signal is fed to an inverting input of the amplifier through resistor 114. The output of amplifier 110 is coupled through a resistor 116 to an inverting input of amplifier 118. The noninverting input of amplifier 118 is coupled through resistor 120 to ground potential. A potentiometer 122, which is connected in series with a resistor 124, forms a feedback path between the output and the inverting input of the amplifier 118. A voltage divider network, designated generally by the numeral 126, is coupled to the output of amplifier 118. A digital voltmeter 128 is coupled to the voltage divider network 126. Diode 130 is coupled to the output of amplifier 118 to prevent damage to capacitor 131 if a positive voltage appears on the output of the amplifier.

The output of amplifier 118 is further coupled through resistor 132 to noninverting inputs of comparators 134 and 136. A voltage divider network designated generally by the numeral 138 is coupled to inverting inputs of comparators 134 and 136. Relay coils 140 and 142 are coupled to the outputs of comparators 134 and 136, respectively.

The operation of the copper control circuit 48 requires an initial calibration of the digital voltmeter 128. Under normal conditions, the plating solution will have a concentration of cupric ions which result in a positive millivolt reading. The exact reading chosen for control purposes depends upon the type of plating bath. A typical reading may be thirty millivolts. Thus potentiometer 122 is adjusted until the voltmeter 128 indicates a reading of thirty millivolts.

As noted above, the specific ion probe 44 and the reference probe 46 are positioned within the container 20 so as to be immersed in the plating solution contained therein. Moreover, a known concentration of cupric ions have been added to the solution in container 20 by the pump 22. This addition of cupric ions should provide an excess of cupric ions over the complexer ions which excess of ions is detectable by the probes 44 and 46. Thus, a positive voltage signal is fed over lines 104 and 106 from the probes 44 and 46, respectively, to the noninverting input of amplifier 110. The signal is amplified and is fed to the inverting input of amplifier 118. The signal present on the output of amplifier 118 is impressed across the network 126. The voltmeter 128 reads a portion of the voltage impressed across the network 126. As noted above, a voltage reading of thirty millivolts indicates that the copper concentration exists in the plating solution at the correct level. Thus, a voltage indication of less than thirty millivolts indicates a deficiency of cupric ions in the plating solution and a voltage indication of greater than thirty millivolts indicates an excess of cupric ions in the plating solution.

The output of amplifier 118 is also fed to the noninverting inputs of comparators 134 and 136. Due to the voltage divider network 138, the comparators 134 and 136 are turned on at different voltage levels. Comparator 134 has a lower reference voltage on its noninverting input and will turn on when the voltage on its noninverting input exceeds the reference voltage on its inverting input. When this occurs, current flows through the relay coil 140 and closes a relay contact (not shown). The closing of the relay contact activates the motor 50 (FIG. 1). The activation of the motor 50 turns on pump 54 which allows cupric sulfate to flow from the container 58 (FIG. 1) into the electroless plating bath. If the voltage from amplifier 118 is more positive than the voltage which appears on the inverting inputs of comparators 134 and 136, the respective comparator turns on and activates motors 50 and 52, respectively. Comparator 134 has a lower threshold voltage when compared to comparator 136; thus, motor 50 will be activated prior to the activation of motor 52 which allows additional cupric sulfate to enter into the plating solution. Subsequently, if the voltage from amplifier 118 exceeds an upper threshold, comparator 136 also turns on activating motor 52 in order to increase the addition of cupric sulfate to the plating solution. As the copper concentration of the bath increases, the solution in container 20 will have an increased concentration of copper since, as noted above, the solution enters the container continuously at a rate of 5 milliliters per minute. When the increased concentration is detected by the probes 44 and 46, a larger negative voltage appears on the output of amplifier 118 thus turning off the comparators 134 and 136. Therefore, as the cupric concentrate contained within the plating solution falls below an acceptable level, additional cupric concentrate is automatically added to the solution in order to maintain the desired ratio of complexer molarity to copper molarity.

What is claimed is:

1. A method of controlling copper concentration in a solution containing a complexer where complexer molarity exceeds copper molarity in a desired ratio, which comprises the steps of:

drawing a sample from a first solution containing a complexer where complexer molarity exceeds copper molarity in a desired ratio;

adding a second solution containing a known concentration of cupric ions to the sample to form a combined solution where the copper molarity exceeds the complexer molarity;

determining the copper concentration of the combined solution as a measure of the copper concentration in the first solution; and adding cupric ions to the first solution in response to the determination of copper concentration of the combined solution to maintain the desired ratio.

2. The method as set forth in claim 1 wherein the second solution includes an acid which is added to the sample along with the known concentration of cupric ions to prevent precipitation of cupric ions contained in the combined solution.

3. The method as set forth in claim 1 which further comprises the step of controlling the pH level of the combined solution to maintain the pH at a desired level.

4. The method as set forth in claim 3 wherein the step of controlling the pH level of the combined solution comprises the steps of:
   determining the pH level of the combined solution; and
   adding a variable amount of diluted acid to the combined solution to reduce the pH level thereof when the pH level exceeds the desired level.

5. The method as set forth in claim 3 wherein the step of controlling the pH level of the combined solution comprises the steps of:
   inserting a pH probe into the combined solution to develop a voltage signal which is indicative of the pH level of the combined solution; and
   controlling a variable feed means, in response to the developed voltage signal, which feeds a variable amount of diluted acid from a supply to the combined solution to reduce the pH level thereof.

6. The method as set forth in claim 1 wherein the step of adding the second solution comprises the step of:
   adding a solution of cupric ions to the sample to provide a combined solution which has a concentration of free cupric ions which are uncomplexed cupric ions;
and wherein the step of determining the copper concentration comprises the step of:
   determining the concentration of the free cupric ions in the combined solution as a measure of the concentration of cupric ions in the first solution.

7. The method as set forth in claim 1 wherein the step of determining the copper concentration comprises the step of developing a voltage signal using specific ion and reference probes placed in the combined solution where the voltage signal is indicative of the copper concentration of the combined solution.

8. The method as set forth in claim 7 wherein the step of adding cupric ions to the solution comprises the steps of:
   comparing the developed voltage signal to a reference voltage; and
   activating a pump which adds additional cupric ions to the first solution when the developed voltage signal exceeds the reference voltage.

9. A method of controlling copper concentration in a solution containing a complexer where complexer molarity exceeds copper molarity in a desired ratio, which comprises the steps of:
   drawing a sample from a first solution containing a complexer where complexer molarity exceeds copper molarity in a desired ratio;
   adding a solution containing a known concentration of cupric ions to the sample to form a combined solution which has a concentration of uncomplexed cupric ions;
   adding an acid solution to the combined solution to prevent precipitation of the free cupric ions therein;
   controlling the pH level of the combined solution to maintain the pH at a desired level;
   determining the concentration of the uncomplexed cupric ions in the combined solution as a measure of the concentration of cupric ions in the first solution; and
   adding cupric ions to the first solution in response to the determination of the cupric ion concentration of the combined solution to maintain the desired ratio.

10. A system for controlling copper concentration in a solution containing a complexer where complexer molarity exceeds copper molarity in a desired ratio, which comprises:
    means for drawing a sample from a first solution containing a complexer where complexer molarity exceeds copper molarity in a desired ratio;
    means for adding to the sample a second solution containing a known concentration of cupric ions to form a combined solution where the copper molarity exceeds the complexer molarity;
    means for determining the copper concentration of the combined solution as a measure of the copper concentration in the first solution; and
    means for adding cupric ions to the first solution in response to the determination of copper concentration of the combined solution to maintain the desired ratio.

11. The system as set forth in claim 10 which further comprises means for adding an acid solution to the combined solution to prevent precipitation of cupric ions contained therein.

12. The apparatus as set forth in claim 10 which further comprises means for controlling the pH level of the combined solution to maintain the pH at a desired level.

13. The system as set forth in claim 12 wherein the controlling means comprises:
    a pH probe positioned within the combined solution to develop a voltage signal which is indicative of the pH level of the combined solution; and
    a variable feed means, responsive to the developed voltage signal, for feeding a selected amount of diluted acid to the combined solution to reduce the pH thereof.

14. The system as set forth in claim 13 wherein the variable feed means comprises:
    a pump for feeding the diluted acid to the combined solution;
    a motor for operating the pump;
    means for amplifying the voltage signal developed by the pH probe positioned within the combined solution; and
    a transistor, which is responsive to the amplified voltage signal, facilitates the activation of the motor, which is coupled to the pump, to feed a selected amount of diluted acid to the combined solution.

15. The system as set forth in claim 10 wherein the determining means comprises a specific ion probe and a reference probe positioned within the combined solution to develop a voltage signal which is indicative of the copper concentration therein.

16. The system as set forth in claim 14 wherein the adding means comprises:
    means for comparing the developed voltage signal to a reference voltage; and
    means, responsive to the comparing means, for feeding additional cupric ions to the first solution when the developed voltage signal exceeds the reference voltage.

17. A system for controlling copper concentration in a solution containing a complexer where complexer molarity exceeds copper molarity in a desired ratio, which comprises:

means for drawing a sample from a first solution containing a complexer where complexer molarity exceeds copper molarity in a desired ratio;

means for adding to the sample a second solution containing a known concentration of cupric ions to form a combined solution which has a concentration of uncomplexed cupric ions;

means for adding, along with the second solution, an acid to the combined solution to prevent precipitation of the uncomplexed cupric ions contained therein;

a pH probe positioned within the combined solution to develop a first voltage signal which is indicative of the pH level of the combined solution;

a variable feed means, responsive to the first voltage signal, for feeding a selected amount of diluted acid to the combined solution to reduce the pH thereof;

a specific ion probe;

a reference probe;

the specific ion and reference probes are positioned within the combined solution to develop a second voltage signal which is indicative of the concentration of uncomplexed cupric ions contained therein;

means for comparing the second voltage signal to a reference voltage; and means, responsive to the comparing means, for feeding additional cupric ions to the first solution when the second voltage signal exceeds the reference voltage to maintain the desired ratio.

* * * * *